United States Patent [19]

McCurley et al.

[11] Patent Number: 5,712,561
[45] Date of Patent: Jan. 27, 1998

[54] FIELD STRENGTH POSITION SENSOR WITH IMPROVED BEARING TOLERANCE IN A REDUCED SPACE

[75] Inventors: Jeffrey L. McCurley, Elkhart; James E. White, Warsaw, both of Ind.; Mike Guthrie, Lyon, Mich.

[73] Assignee: CTS Corporation, Elkhart, Ind.

[21] Appl. No.: 659,963

[22] Filed: Jun. 7, 1996

Related U.S. Application Data

[63] Continuation of Ser. No. 206,568, Mar. 4, 1994, abandoned.

[51] Int. Cl.⁶ ............................................... G01B 7/30
[52] U.S. Cl. ........................ 324/207.2; 324/207.22; 324/207.25
[58] Field of Search ................ 324/207.2, 207.21, 324/207.22, 207.23, 207.24, 207.25, 173, 174, 251; 123/146.5 A, 617; 310/68 B; 73/514.31

[56] References Cited

U.S. PATENT DOCUMENTS

| | | |
|---|---|---|
| 3,112,464 | 11/1963 | Ratajski et al. . |
| 3,742,243 | 6/1973 | Gamble .................. 324/174 X |
| 4,392,375 | 7/1983 | Eguchi et al. ........... 324/207.21 X |
| 4,570,118 | 2/1986 | Tomczak et al. . |
| 4,703,261 | 10/1987 | Berchtold .............. 324/207.2 |
| 5,055,781 | 10/1991 | Sakakibara et al. .... 324/207.21 |
| 5,159,268 | 10/1992 | Wu . |
| 5,164,668 | 11/1992 | Alfors . |
| 5,191,284 | 3/1993 | Moretti et al. ........ 324/207.2 X |
| 5,270,645 | 12/1993 | Wheeler et al. ........ 324/207.25 X |

FOREIGN PATENT DOCUMENTS

| | | | |
|---|---|---|---|
| 6701 | 1/1989 | Japan .................... 324/207.2 |
| 893986 | 4/1962 | United Kingdom ........ 324/207.25 |
| 990993 | 5/1965 | United Kingdom . |
| 2229006 | 9/1990 | United Kingdom . |

*Primary Examiner*—Gerard R. Strecker
*Attorney, Agent, or Firm*—Jones, Day, Reavis & Pogue

[57] ABSTRACT

A position sensor has a shaped dual magnet structure carried upon a pole piece having a generally "c" shaped cross-section. The magnet and pole piece define a generally circular linear field which is concentric about the axis of rotation of the complete rotor. A Hall effect device is inserted into the open portion or gap between the two magnets and is exposed to a well defined field. Through the use of selected geometries and particular magnet materials, a precise, compact and yet tolerant magnetic circuit is produced.

11 Claims, 2 Drawing Sheets

5,712,561

FIELD STRENGTH POSITION SENSOR WITH IMPROVED BEARING TOLERANCE IN A REDUCED SPACE

CROSS REFERENCE TO RELATED APPLICATIONS

This is a continuation of application Ser. No. 08/206,568, filed Mar. 4, 1994, now abandoned.

BACKGROUND OF THE INVENTION

1. Field of the Invention

This invention pertains generally to position sensing, and specifically to position sensors which are compact, durable and precise for application to rugged and demanding environments.

2. Description of the Related Art

Electronic devices are advancing technologically at phenomenal rates. The cost decreases continually, and is accompanied by almost simultaneous increases in capability. These more capable, lower cost devices and circuits are applicable to an ever increasing number of requirements. As this trend continues, more ways are needed for electronic circuits to interface with non-electronic devices and systems. Generally this interface is accomplished through a combination of sensors and actuators.

Position sensing is used to allow an electrical circuit to gain information about an event or a continuously varying condition. For example, when a sewing machine operator depresses a pedal, a pedal position sensor is used to signal a demand for activation of the drive motor. In addition, the sensor may be used to establish an amount of demand, or a desired speed at which the motor will operate.

Sensors must endure many millions or even billions of small motions referred to as dithers. These dithers are often the result of mechanical motion and vibration carried into the sensor. During the life of a sensor there may also be a million or more full cycles required.

There are many applications for sensors, and a wide variety of technologies to fill these needs. Each of these technologies offers a unique set of advantages and limitations. Of these technologies, magnetic sensing is known to have a unique combination of long life components and excellent resistance to contaminants. However, in the prior art these devices were only applied where little precision was required, such as in proximity detection.

However, magnetic sensors have been limited in application. These limitations are generally derived from the need for linearity and precise output. In the case of a pedal position sensing application, an operator gently depressing the pedal will expect to see a measurable change in output of a motor or engine.

In fact, the first few degrees of rotation may be the most consequential in terms of percentage change in motor output. Sensitivity and precision are most important close to the zero, or no demand position. Deviations in linearity of less than one percent may have very adverse affect on performance and even on motor control functions. Sensing a demand for motor output when the operator is not depressing the pedal will obviously have adverse consequence. Therefore, at the motor zero set point, sensors are typically specified for extremely tight and reproducible tolerances through all extremes of climate, contamination, and other external factors.

Magnetic circuits offer admirable performance upon exposure to the usual contaminants. However, linearity and tight tolerances are another issue.

Sensors are subjected to forces that change the alignment of the moving portion of the sensor with respect to the stationary portion. Somewhere in the system is at least one bearing, and this bearing will have a finite amount of play, or motion. That play results in false movement between the fixed and moving components of the sensor. Unfortunately, magnetic circuits of the prior art tend to be very sensitive to the type of mechanical motion occurring in a sensor bearing. The problem is heightened with poor or worn bearings.

Typical magnetic circuits use one or a combination of magnets to generate a field across an air gap. The magnetic field sensor, be this a Hall effect device or a magnetoresistive material or some other magnetic field sensor, is then inserted into the gap. The sensor is aligned centrally within the cross-section of the gap.

Magnetic field lines are not constrained anywhere within the gap, but tend to be most dense and of consistent strength centrally within the gap. Various means may be provided to vary the strength of the field monitored by the sensor.

Regardless of the arrangement and method for changing the field about the sensor, the magnetic circuit faces several obstacles which have heretofore not been overcome. Movement of the sensor relative to the gap as a result of bearing play will lead to a variation in field strength measured by the sensor. This effect is particularly pronounced in Hall effect, magneto-resistive and other similar sensors, where the sensor is sensitive about a single axis and insensitive to perpendicular magnetic fields.

The familiar bulging of field lines jumping a gap illustrates this, where a Hall effect sensor not accurately positioned in the gap will measure the vector fraction of the field strength directly parallel to the gap. In the center of the gap, this will be equal to the full field strength. The vector fraction perpendicular thereto will be ignored by the sensor, even though the sum of the vectors is the actual field strength at that point. As the sensor is moved from the center of the gap, the field begins to diverge, or bulge, resulting in a greater fraction of the field vector being perpendicular to the gap. Since this will not be detected by the sensor, the sensor will provide a reading of insufficient magnitude.

In addition to the limitations with regard to position and field strength, another set of issues must be addressed. A position sensor must be precise in spite of fluctuating temperatures. In order to gain useful output, a magnet must initially be completely saturated. Failure to do so will result in unpredictable performance. However, operating at complete saturation leads to another problem referred to in the trade as irreversible loss. Temperature cycling, particularly to elevated temperatures, permanently decreases the magnetic output.

A magnet also undergoes aging processes not unlike those of other materials, including oxidation and other forms of corrosion. This is commonly referred to as structural loss. Structural and irreversible loss must be understood and dealt with in order to provide a reliable device with precision output.

Another significant challenge in the design of magnetic circuits is the sensitivity of the circuit to surrounding ferromagnetic objects. For some applications a large amount of iron or steel may be placed in very close proximity to the sensor. The sensor must not respond to this external influence.

The prior art is illustrated, for example, by Tomczak et al in U.S. Pat. No. 4,570,118. Therein, a number of different embodiments are illustrated for forming the magnetic circuit of a Hall effect position sensor. The Tomczak et al disclosure teaches in one embodiment the use of a sintered samarium cobalt magnet material formed into two shaped magnets of opposite polarity across an air gap of varying length.

No discussion is provided by Tomczak et al for how each magnet is magnetically coupled to the other, though from the disclosure it appears to be through the use of an air gap formed by a plastic molded carrier. Furthermore, no discussion is provided as to how this magnetic material is shaped and how the irreversible and structural losses will be managed. Sintered samarium cobalt is difficult to shape with any degree of precision, and the material is typically ground after sintering. The grinding process is difficult, expensive and imprecise.

The device may be designed and ground, for a substantial price, to be linear and precise at a given temperature and a given level of magnetic saturation, presumably fully saturated. However, such a device would not be capable of performing in a linear and precise manner, nor be reliable, through the production processes, temperature cycling and vibration experienced by sensors.

Furthermore, devices made with this Tomczak et al design are highly susceptible to adjacent ferromagnetic objects. The variation in adjacent ferromagnetic material will serve to distort the field and adversely affect both linearity and precision. The open magnetic circuit not only adversely affects sensitivity to foreign objects, but also sensitivity to radiated energies, commonly referred to as Electro-Magnetic Interference (EMI or EMC).

The Tomczak et al embodiments are further very sensitive to bearing play. The combination of an open magnetic circuit and radially narrow permanent magnet structure provides no tolerance for motion in the bearing system. This motion will be translated into a changing magnetic field, since the area within the gap in which the field is parallel and of consistent magnetic induction is very small.

Ratajski et al in U.S. Pat. No. 3,112,464 illustrate several embodiments of a brushless Hall effect potentiometer. In the first embodiment they disclose a shaped, radially magnetized structure which varies an air gap between the magnetic structure and a casing, not unlike the last embodiment of the Tomczak et al patent mentioned above. However, there is no provision for radial or axial motion of the magnet carried upon the rotor. Furthermore, the large magnetic structure, like the Tomczak ground magnet, is difficult to manufacture and relatively expensive.

Wu in U.S. Pat. No. 5,159,268 illustrates a shaped magnet structure similar to Ratajski et al. The structure illustrated therein suffers from the same limitations as the Ratajski et al disclosure. Additionally, the device of the Wu disclosure offers no protection from extraneous ferromagnetic objects.

Alfors in U.S. Pat. No. 5,164,668 illustrates a sensor less sensitive to radial and axial play. The disclosed device requires a large shaped magnet for precision and linearity. The size of the magnet structure places additional demand upon the bearing system. No discussion therein addresses magnet materials, methods for compensating for irreversible and structural losses, or shielding from extraneous ferromagnetic objects. The combination of large magnet, enhanced bearing structure, and added shielding combine to make a more expensive package.

Each of the prior art references suffers the disadvantages of high field strengths at the zero set point. In the Wu and Alfors patents, a bipolar field is utilized. A strong magnetic field is encountered at or near the zero point, progressively diminishing in strength to a zero magnetic field at or near a mid-point, and then returning to a strong magnetic field. In the first embodiments of the Tomczak et al disclosure, a bipolar field is also utilized, in that near the midpoint of rotation, the two opposing fields are designed to cancel each other. As the sensor is rotated out from the midpoint however, the magnetic induction will no longer cancel and the sensed field will get progressively stronger.

In the last embodiment of Tomczak et al a unipolar field is disclosed. However, the use of sintered samarium cobalt magnet materials together with the necessary grinding operations will force the minimum thickness of the magnet to be consequential.

Attempting to grind too thin a section will lead to large manufacturing fall-out due to chipping and breakage. Yet grinding is essential for a sintered magnet in order to produce a linear output. In view of the large magnetic induction generated by samarium cobalt, the field will be substantial even at the thinnest point in the magnet.

SUMMARY OF THE INVENTION

The present invention overcomes the aforementioned limitations of the prior art and perceived barriers to the use of a precision magnetic position sensor through the use of a special geometry magnetic structure. The magnet structure includes facing magnets which extend substantially from the axis of rotation radially to beyond a pole piece. At the outer circumference of the pole piece, the magnet wraps about the edge thereof, which tends to linearize the field lines within the region bounded by the pole piece and maintain compactness. At a low end of rotation, intended to be about a zero set point, an additional means is provided to divert the magnetic field lines from linear travel within the gap to perpendicular thereto, allowing the measurement of a truly zero field at or near the zero set point.

DESCRIPTION OF THE PREFERRED EMBODIMENT

Figure 1:
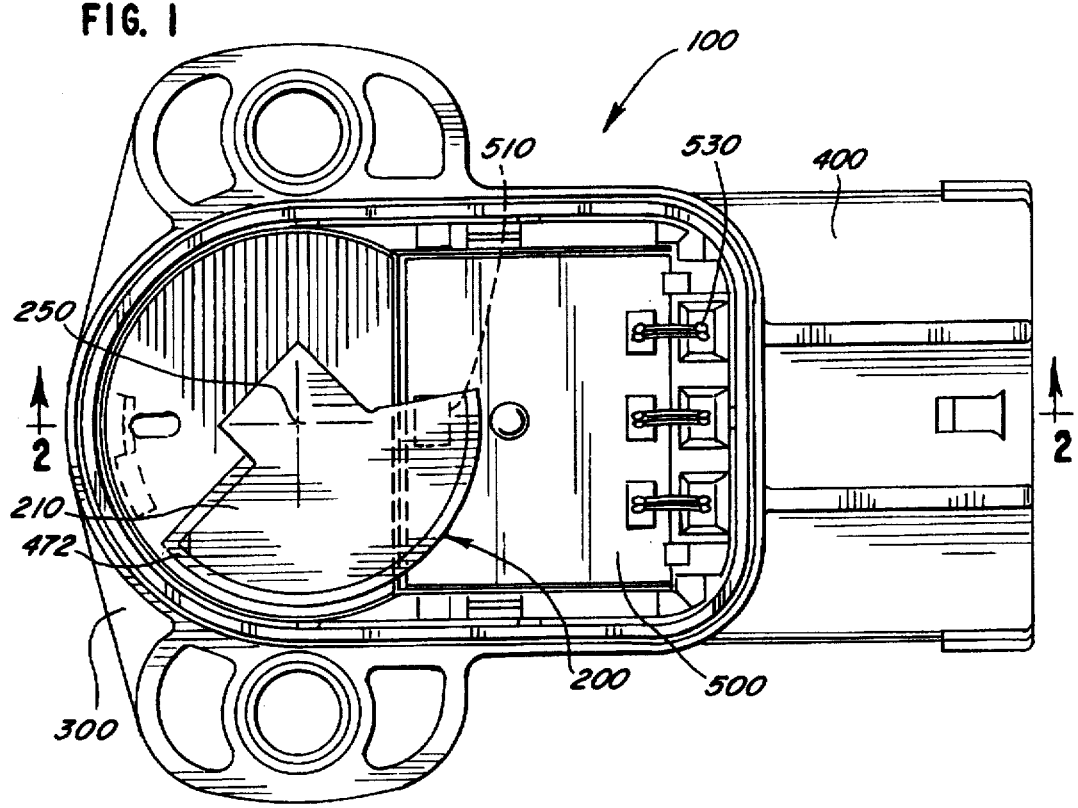
FIG. 1 illustrates a portion of the preferred embodiment of the invention from a top view with the cover removed for clarity.
Figure 2:
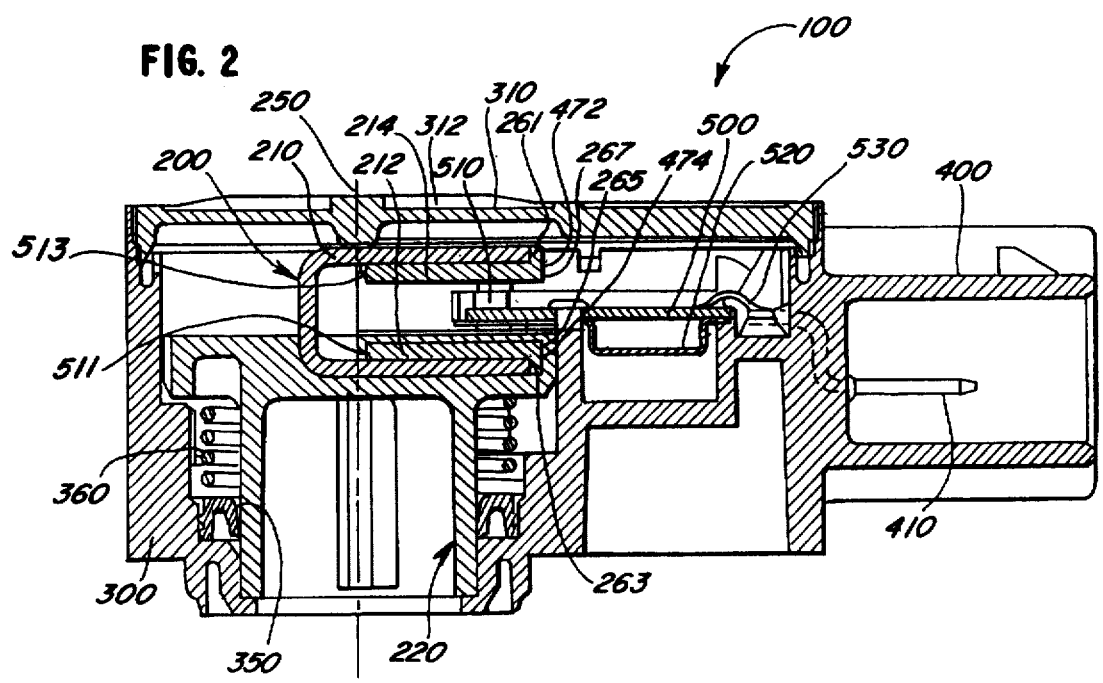
FIG. 2 illustrates the preferred embodiment of FIG. 1 from a cross-sectional view taken along line 2' of FIG. 1.

In FIGS. 1 and 2 a preferred embodiment rotary sensor in accord with the present invention is designated generally by the numeral 100. The sensor includes a housing 300 and a magnetic structure or assembly 200 of arcuate periphery and generally "c"-shaped cross section mounted to the housing. Magnet structure 200 includes therein a magnetically permeable pole piece 210, shaped magnets 212 and 214, an air gap 216 and is supported by a base or molded rotor cup 220.

Pole piece 210 is bonded to magnets 212 and 214 such that the air gap is formed between and is bordered by magnets. This use of two magnets substantially reduces loss through the air gap which otherwise occurs with only a single magnet. The closed magnetic circuit which is completed by the pole piece 210 improves performance by being less sensitive to bearing play and less sensitive to external ferromagnetic objects. A closed magnetic circuit exists, for the purposes of this disclosure, when the external flux path of a permanent magnet is confined with high permeability material. The pole piece 210, the magnets 212 and 214 and the air gap 216 form the closed magnetic circuit. Air is understood to be low permeability material. Pole piece 210 further reduces the size of magnets 212 and 214 required, and may be manufactured from molded or sintered metals. More preferably, pole piece 210 is formed from sheet steels such as ANSI 430 stainless steel. As shown in FIGS. 1 and 2, the pole piece has a generally pie shape configuration in plan view and has a radius from an axis 250 to outer edges 261, 263.

Shaped magnets 212 and 214 are preferably formed by molding magnetic materials such as bonded ferrite. Bonded ferrite offers both a substantial cost advantage and also a significant advantage over other similar magnetic materials in structural loss due to corrosion and other environmental degradation. Additionally, bonded ferrite may be produced having a very thin, very low field strength region close to the zero set point. The advantage of this low field at the zero set point is discussed further herein below in reference to FIG. 4. Other magnetic materials may be suitable, as will be determined by one skilled in the art.

Magnets 212 and 214 should extend substantially from the outer edges 261, 263 of pole piece 210 to a region very close to, or, design allowing, in line with the axis of rotation 250. This large extension of magnets 212 and 214 in the radial direction greatly reduces the effects of radial motion of magnetic structure 200.

Additionally, magnets 212 and 214 are formed with lip structures 474 and 472 as illustrated best in FIG. 2. These formations extend out beyond and partially around pole piece 210. The lips 472 and 474 serve to expand the "sweet zone" of operation of Hall effect device 510, by forcing a larger area of linear magnetic field lines passing through the air gap and coupled between magnets 212 and 214. This larger area of linear field lines directly corresponds to greater tolerance for both radial and axial play, and yet minimizes the radial extension of the magnets.

Molded rotor cup 220 includes a surface designed to engage with a shaft extending from a device whose position is to be measured. Molded rotor cup 220 then rotates about an axis identified from end view as 250 in FIG. 1 and carries therewith the remainder of magnet structure 200. Molded rotor cup 220 is retained by housing 300, seal 350, helical spring 360 and cover 310.

Cover 310 engages with housing 300 and may, for example, be ultrasonically welded in place. Cover 310 is strengthened against warpage and deflection through the formation of ribs 312.

Within the gap formed by magnets 212 and 214 is a hybrid circuit substrate 500 carrying thereon the Hall effect device 510. Hall effect device 510 should be positioned somewhere between the outer edges 265, 267 of magnets 212 and 214, respectively, and the inner ends 511, 513 of the magnets near axis 250, but not particularly close to either the edges or the ends, so as to avoid the field bulging effect mentioned earlier.

Hybrid substrate 500 may be attached by heat staking or other similar method to the housing 300. Hybrid substrate 500 additionally carries thereon electrical circuitry within tray 520. This tray 520 acts as a container into which appropriate potting compounds may be placed to provide all necessary environmental protection to the associated circuitry. Tray 520 should be electrically grounded for protection against radiated fields (EMI and EMC).

Hybrid substrate 500 is electrically interconnected to electrical terminals 410 through wire bonds 530, though it is well understood that any of a large number of electrical interconnection techniques would be suitable. Electrical connector terminals 410 emerge from housing 300 at a connector body 400, for interconnection to standard mating connectors.

Figure 3:
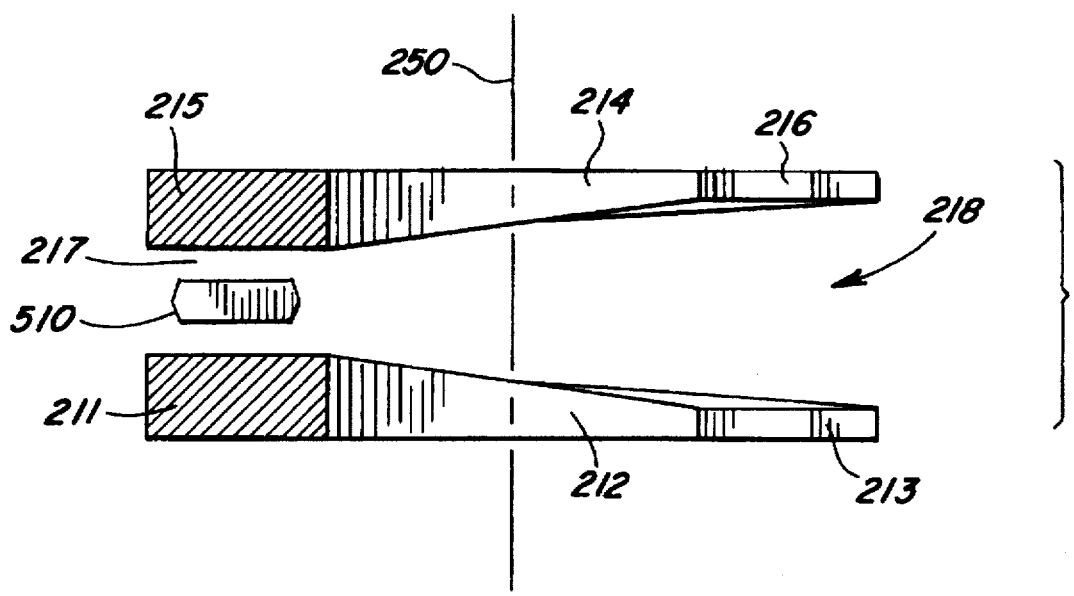
FIG. 3 illustrates a schematic view of the magnet and Hall effect device structure.

Magnetic structure 200 rotates about the generally center axis 250 relative to housing 300, thereby rotating magnets 212 and 214 together with pole piece 210. Hall effect device 510 is stationary relative to the housing 300. Best illustrated in FIG. 3, magnets 212 and 214 are shaped generally helically so as to have a relatively thicker end and a relatively thinner end. At the thicker ends 211 and 215, which is at the same angle of rotation of magnetic structure 200 for both magnets 212 and 214, there is a narrow air gap 217. At the thinner ends 213 and 216, there is a correspondingly wide air gap 218. The result is the generation of less magnetic induction across gap 218, with more magnetic induction across gap 217.

Rotation of pole piece 210 about axis 250 results in changing field magnetic induction which is directly measured by Hall effect device 510. Proper shaping of the gap will produce a linear output from Hall effect device 510. However, such a system will not perform linearly and with precision and resistance to bearing play over its life without further design considerations.

In order to stabilize a magnet against irreversible losses, it is necessary first to saturate magnets 212 and 214 and then to demagnetize the magnets by a small amount. The magnetic structure 200 does not demagnetize evenly from magnet ends 211 and 215 to magnet ends 213 and 216, without special consideration. Absent the appropriate demagnetization, described in our copending application Ser. No. 08/223,474 filed Apr. 5, 1994, now U.S. Pat. No. 5,557,493, incorporated herein by reference, the resulting device will either lose precision as a result of temperature excursions or will lose linearity as a result of stabilizing demagnetization.

Figure 4:
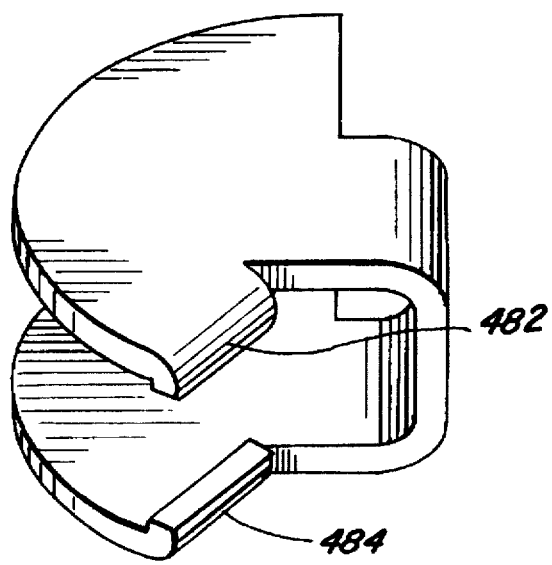
FIG. 4 illustrates the pole piece in accord with the present invention.

FIG. 4 illustrates the pole piece design 210 having two small extensions or dams 482 and 484. These dams serve to attract magnetic flux at the low field end of rotation, within gap 218 of FIG. 3, to thereby further reduce the strength of the vector portion of the magnetic field that is parallel to the axis of rotation 250. This deflection of the magnetic field reduces the measured field strength, thereby lowering the output at the low end of rotation. The lower the output at this low end, the less the impact of non-linearities and variances, such as the effects of temperature and irreversible and structural losses. These non-linearities and variances are most consequential, as noted hereinabove, at or near the zero set point. The use of a zero Gauss field at the zero set point offers much advantage in maintaining very tight tolerances by eliminating gain errors caused by the magnets, the magnetic sensor 510 and the conditioning electronic circuit located on substrate 500.

The apparatus for measuring angular or rotary position described herein as the preferred embodiment is a low cost structure due to the minimal weight and reduced demands upon magnetic components. In addition, there are many performance advantages not heretofore obtainable, including reduced sensitivity to bearing play, resistance to contamination and environment, reduced sensitivity to externally located fields, energies and objects, durability for motion and dithers, precision, linearity, compactness, reduced complexity, and reduced cost.

While the foregoing details what is felt to be the preferred embodiment of the invention, no material limitations to the scope of the claimed invention is intended. While a rotary sensor is illustrated for an exemplary purposes, one of ordinary skill will readily be able to adapt the claimed invention to linear sensors. while a Hall effect device is illustrated, magnetoresistive and other magnet sensors will similarly be adapted for use herein. Further, features and design alternatives that would be obvious to one of ordinary skill in the art are considered to be incorporated herein. The scope of the invention is set forth and particularly described in the claims hereinbelow.

We claim:

1. A rotary position sensor comprising:
   a) a housing;
   b) an assembly for providing a closed magnetic circuit including:
      b1) a first magnet;
      b2) a second magnet;
      b3) a magnetically permeable pole piece interconnecting the first and second magnets; and
      b4) a varying dimension air gap defined between the first magnet and the second magnet;
   the first and second magnets being structured and dimensioned to provide the varying dimension air gap and to form a variable magnetic field coupled therebetween;
   the assembly being rotatably mounted in the housing about an axis, the axis being generally parallel to the magnetic field coupled between the magnets;
   c) a magnetic field sensing means positioned in the air gap for sensing the variable magnetic field coupled between the first and second magnets; and
   d) a first permanent magnet lip portion on the first magnet and a second permanent magnet lip portion on the second magnet; the first lip portion and the second lip portion being structured and dimensioned to expand the variable magnetic field coupled between the magnets.

2. The rotary position sensor of claim 1 wherein the first magnet, the second magnet and the magnetically permeable pole piece are arranged in a generally C-shaped cross-sectional configuration with said first and second magnets aligned in parallel planes extending from said magnetically permeable pole piece.

3. The rotary position sensor of claim 1 wherein the sensing means is stationarily mounted in the housing.

4. The rotary position sensor of claim 1 wherein said sensing means comprises a Hall effect device.

5. The rotary position sensor of claim 1 wherein said first and second magnets are shaped generally hellically so that each of the magnets has a relatively thicker end and a relatively thinner end.

6. The rotary position sensor of claim 5 wherein said first and second magnets are aligned in a manner such that the relatively thicker ends of the first and second magnets face each other across the air gap and the relatively thinner ends of the first and second magnets face each other across the air gap.

7. The rotary position sensor of claim 1 wherein the magnetically permeable pole piece is generally C-shaped in cross-sectional profile and includes a first arm and a second arm with the first magnet affixed to the first arm and the second magnet affixed to the second arm.

8. The rotary position sensor of claim 7 wherein the generally C-shaped magnetically permeable pole piece includes at least one dam thereon for attracting magnetic flux.

9. The rotary position sensor of claim 7 wherein the lips on the magnets extend beyond and partially around the arms of the C-shaped magnetically permeable pole piece.

10. The rotary position sensor of claim 7 wherein said first and second magnets are shaped generally helically so that each of the magnets has a relatively thicker end and a relatively thinner end.

11. The rotary position sensor of claim 10 wherein said first and second magnets are aligned in a manner such that the relatively thicker ends of the first and second magnets face each other across the air gap and the relatively thinner ends of the first and second magnets face each other across the air gap.

* * * * *